(No Model.)  
4 Sheets—Sheet 1.

R. G. BURLEIGH.
TUBULAR CUTTER LATHE.

No. 342,822.  Patented June 1, 1886.

WITNESSES  
N. S. Amstutz  
G. W. Hemingway

Robert G. Burleigh. INVENTOR  
By Jno. A. Crowell  
Attorney (No Model.)  
4 Sheets—Sheet 2.
R. G. BURLEIGH.
TUBULAR CUTTER LATHE.
No. 342,822. Patented June 1, 1886.
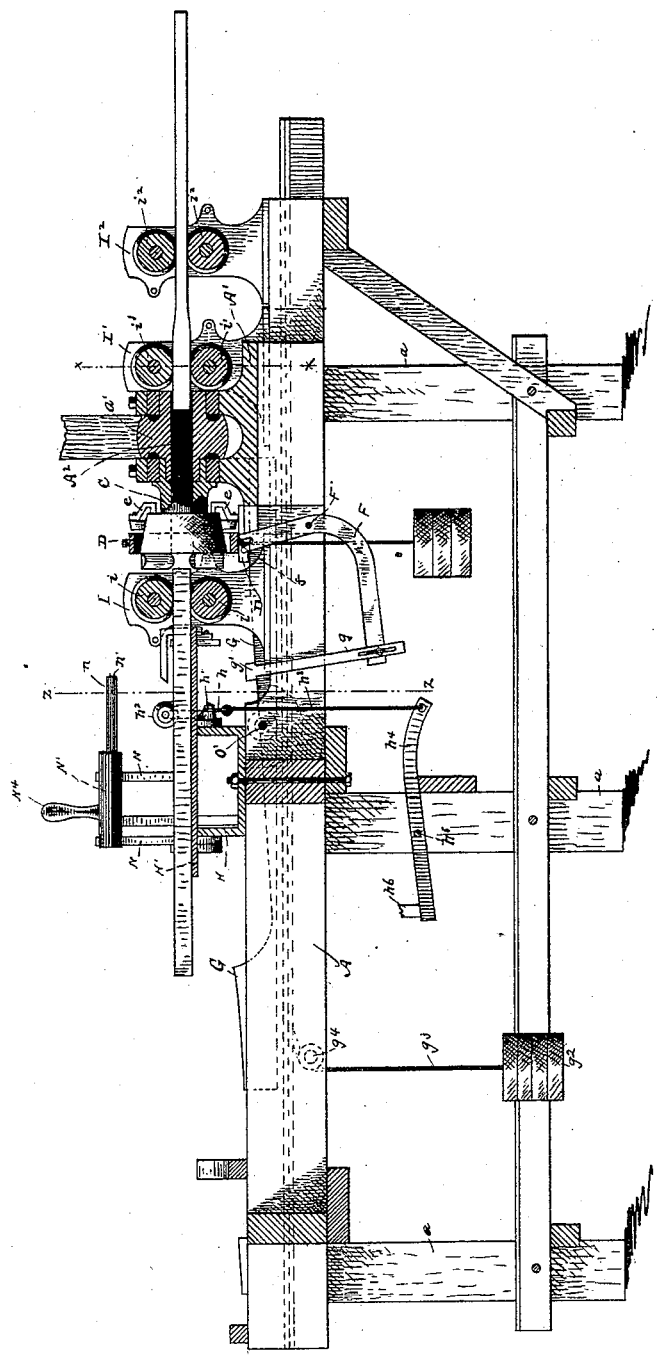
WITNESSES
Robert G. Burleigh INVENTOR
By Jno. Crowell
Attorney (No Model.)  R. G. BURLEIGH.  4 Sheets—Sheet 3.
TUBULAR CUTTER LATHE.
No. 342,822.  Patented June 1, 1886.
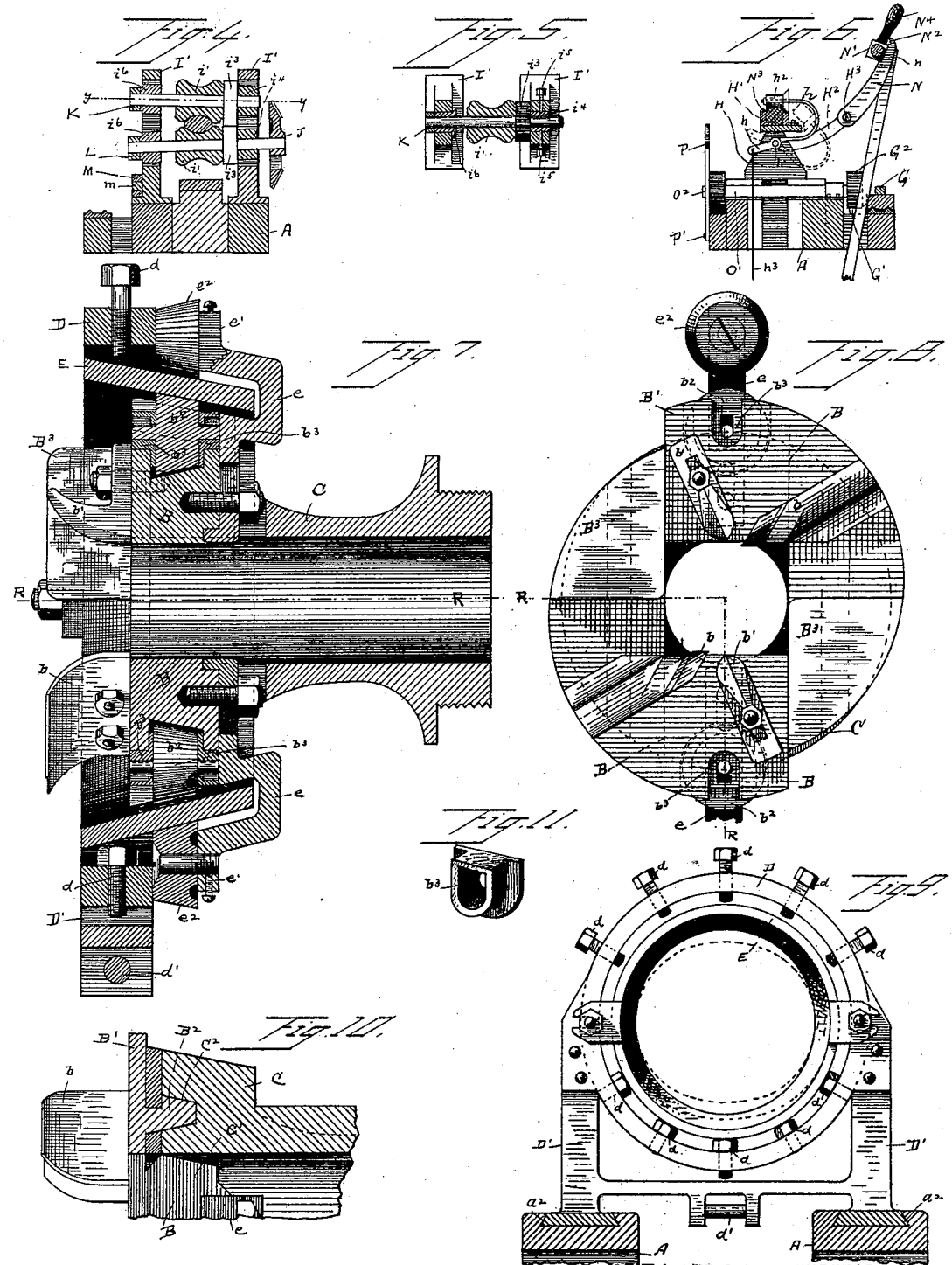
WITNESSES
Robert G. Burleigh INVENTOR
Attorney (No Model.)  4 Sheets—Sheet 4.
R. G. BURLEIGH.
TUBULAR CUTTER LATHE.
No. 342,822.  Patented June 1, 1886.
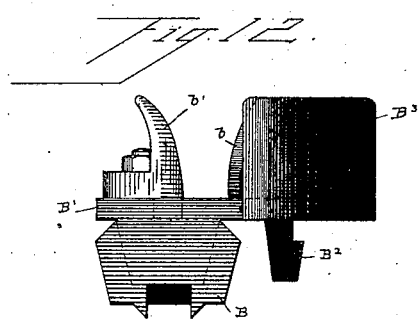
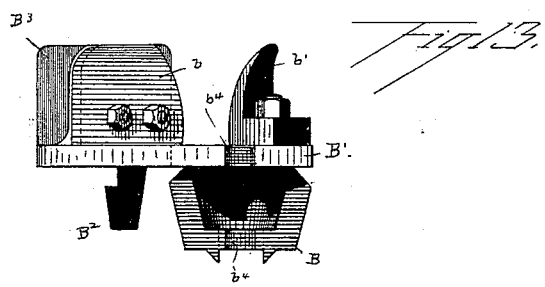
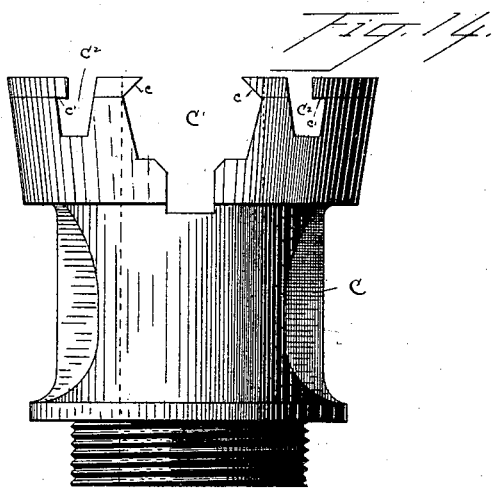
WITNESSES
Robert G. Burleigh  INVENTOR
By Jno. Crowell
Attorney

UNITED STATES PATENT OFFICE.

ROBERT G. BURLEIGH, OF GLASGOW, SCOTLAND.

TUBULAR CUTTER-LATHE.

SPECIFICATION forming part of Letters Patent No. 342,822, dated June 1, 1886.

Application filed October 16, 1885. Serial No. 180,046. (No model.)

*To all whom it may concern:*

Be it known that I, ROBERT G. BURLEIGH, of Glasgow, Scotland, have invented certain new and useful Improvements in Lathes for Turning Irregular Shapes; and I do hereby declare the following to be a full, clear, and exact description of the invention, such as will enable others skilled in the art to which it pertains to make and use the same.

My invention relates to improvements in lathes for turning irregular shapes, more especially hammer-handles; and it consists in certain features of construction and in combination of parts, hereinafter described, and pointed out in the claims.

Figure 1:
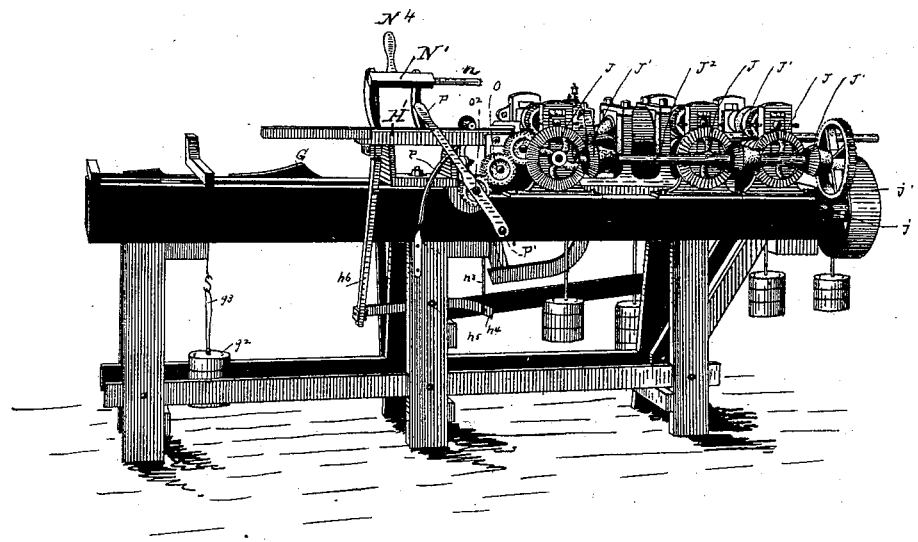
Figure 2:
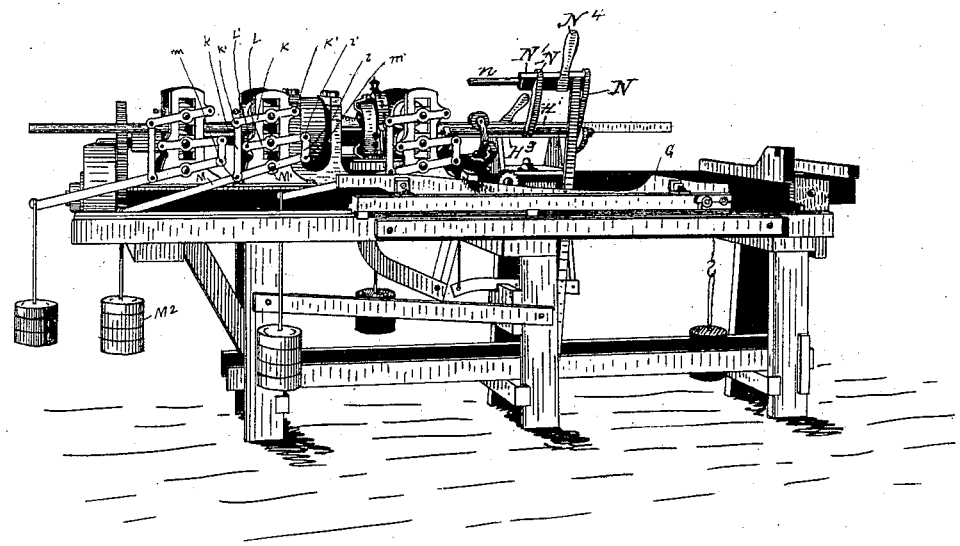

In the accompanying drawings, Figure 1 is a view in perspective of my improved machine, looking from the left-hand side. Fig. 2 is a view in perspective looking from the right-hand or rear side. Fig. 3 is a central vertical longitudinal section. Fig. 4 is a transverse section on the line of $x\ x$, Fig. 3, looking to the right. Fig. 5 is a horizontal section on the line of $y\ y$, Fig. 4. Fig. 6 is a transverse section on the line of $z\ z$, Fig. 3, looking to the left. Fig. 7 is a central vertical longitudinal section through the cutter-head, spindle, &c. Fig. 8 is a front elevation of the cutter-head. Fig. 9 is a front elevation of the guiding-ring for the cutters, showing the manner of compressing the ring to form an ellipse. Fig. 10 is a section of the cutter-head on the line of R R, Figs. 7 and 8. Fig. 11 is a view in perspective of a bushing, hereinafter more fully described. Figs. 12 and 13 are plan views of the respective sliding blocks and attached cutters detached from the cutter-head. Fig. 14 is a plan view of the cutter-head with the cutter-blocks removed.

A represents a supporting-frame, that is mounted on suitable legs, $a$. On this frame is mounted the head-block A', provided with suitable boxes, in which is journaled the hollow spindle $A^2$. This spindle is provided with a driving-pulley, $a'$, and on one end of the spindle, overhanging the box, is mounted the cutter-head C. This cutter-head has a deep broad groove or recess, C', running across the face thereof, and parallel grooves $C^2$ are at equal distances on either side of the central groove, C'. (See Fig. 14.) The walls of the recess C', at $c$, and of the groove $C^2$, at $c'$, are undercut, as shown.

Two blocks, B, are fitted into and operate, respectively, in the ends of the recess C'. Each block is integral with a plate, B', that fits over a portion of the face or end of the cutter-head. The plate B' is attached to or made integral with a rib, $B^2$, that fits into one of the grooves $C^2$, the rib $B^2$ of the opposite plate fitting into the other groove, $C^2$. The lugs $B^2$, cast respectively on each plate B', are for balancing the cutter-head.

To each plate B' is secured a cutting-tool, $b$, the cutting-edge of the tool being curved in the usual manner of such tools. These tools are arranged to engage opposite sides of the blank that is being fed through the hollow spindle and cutter-head. Just in front of each knife is adjustably secured a guard, $b'$. The end of the guard is curved to correspond with the curve of the cutter, and is adjusted to press upon the blank just in advance of the cutting-tool to gage the thickness of the shaving and prevent the wood being turned out too deep by the cutter. The cutters, if made to revolve in circles concentric with the axis of the cutter-head, would of course turn a round handle of larger or smaller size, according to the distance that the cutters were separated or removed from that axis of the head.

The mechanism for moving these cutters toward and from the axis with each half-revolution of the cutter-head, so as to turn an elliptical handle, will be next described. D is a ring, that is arranged concentric with the cutter-head, and is mounted on the saddle or carriage D'. This saddle runs in suitable ways, $a^2$, attached to the frame A, so that the saddle may be moved a few inches in the direction lengthwise of the machine. Inside the ring D is a conical guiding-band, E, that is held in position by a series of set-screws, $d$, that pass through threaded holes in the ring D, and engage the band near the larger end thereof. (See Figs. 7 and 9.) The band E is arranged to encircle the forward portion of the cutter-head, and each sliding block B is provided with a roller, $b^2$, that engages the inside of the band, and thus limits the outward movement of the block and attached knife. Each block B has also a crooked arm, $e$, attached, the outer or free end of which has a stud, $e'$, attached, on which a roller, $e^2$, is journaled, that engages the outside of the band E, and limits the inward movement of the block and cutter. Suppose the saddle D' were moved along the ways $a^2$ until the rollers $b^2$ and $e^2$ engaged the band E at or near the smaller end, and while in this position of parts the cutters are set to turn the handle at the smallest part thereof. Now, if the band E, by means of the saddle, is moved along so that the said rollers $b^2$ and $e^2$ would engage the band E as near the large end of the band as practicable without colliding with the set-screws $d$, the cutters in this latter position would have reached the limit of their distention and would turn the handle to its maximum size.

The mechanism for moving the band E backward or forward for gaging the size of the handle at different parts is as follows: F is a lever of the bell-crank variety, and is fulcrumed at F'. The end of the upright arm of the lever is forked at $f$, and embraces the pintle $d'$ of the saddle. (See Figs. 3 and 9.) The lateral arm of the lever F is pivoted to the rod $g$. The upper end of the latter, at $g'$, hooks over and rides upon the pattern G. This pattern is drawn along endwise in unison with the blank that is being turned, and the rod $g$ is raised or depressed according as the hook end thereof engages swells or depressions on the pattern, and by means of the connections already shown the band E is moved so that the handle is turned in shape to correspond with the pattern. It will be readily seen that when the rod $g$ is elevated the broad end of the band E is made to approach the guide-rollers $b^2$ and $e^2$, and vice versa. The gravity of the rod $g$ and the lateral arm of the lever F are sufficient to depress this part when depressions in the pattern permit. The rod $g$, near the upper end, passes through a staple or other suitable device, (not shown,) to hold the rod in an upright position, and the hook end of the rod may be provided with a roller to travel on the pattern, if preferred. A rack, G', is connected with the pattern, and by means of a pinion, $G^2$, the rack and pattern are made to slide along on the frame A in the same direction and at the same speed as the blank moves. When a handle is finished, the gearing that moves the rack is disconnected at some point, and the weight $g^2$ by means of the cord $g^3$ and pulley $g^4$, draws the rack and attached pattern back to the place of beginning. The apparatus as thus far described would turn a handle round in cross-section, but varying in size, according to the shape of the pattern. Now, by compressing opposite sides of the band E by means of the set-screws $d$, the band is made to assume an elliptical form, in which case the rollers $b^2$ and $e^2$ move the respective blocks B and attached cutter in and out with every half-revolution of the cutter-head, and the result is that the handle is turned elliptical in cross-section, but still corresponds in contour with the pattern. The trunnions of the rollers $b^2$, instead of being journaled directly in the respective blocks B, are journaled in bushings $b^3$, (see Fig. 11,) that are slid into grooves $b^4$ in the respective blocks B, by which arrangement the bushings, when worn are easily replaced with new ones at a trifling cost. The upright frame H and housings I, I', and $I^2$ are secured to the frame A—the first two in front of and the last two at the rear of the cutter-head and spindle. On top of the frame H is secured a trough, H', in which the blank-handles are laid in position to be fed into the machine. A pair of feed-rolls, $i$, one flat faced and the other a guide-roll, have trunnions journaled in suitable boxes that are supported by the housings I. The handle is moved endwise along the trough H' until it engages these feed-rolls, by which latter the blank is fed to the cutters. Grooved rolls $i'$ and $i^2$ are in a similar manner supported, respectively, by the housings I' and $I^2$. The grooved rollers receive the turned handle as it leaves the hollow spindle $A^2$, and discharges it at the rear end of the machine.

The three sets of rollers, so far as relates to the manner of gearing, adjustment of boxes, and mechanism for opening and closing each set of rolls, are alike, and a description of one set will therefore answer for the other sets. As shown in the vertical section, Fig. 4, the two rollers are intergeared by pinions $i^3$, and the trunnion of the lower roller has mounted thereon, outside the journal-box, the bevel-gear J. These gears J engage the pinions J', that are mounted on the shaft $J^2$. (See Fig. 1.) The boxes $i^4$, that are between the gears $i^3$ and J, are secured by set-screws $i^5$, (shown in the horizontal section, Fig. 5,) the set-screws forming pivotal bearings for the boxes, so that the latter will rock slightly to allow the rolls to be opened or closed a trifle. The boxes $i^6$, on the opposite end of the rolls, may slide vertically in the housings. The trunnions at this end extend through and beyond the boxes. The upper trunnion outside of the box $i^6$, is journaled in the lever K, that is fulcrumed at K'. The trunnion of the lower roller is in like manner journaled outside the box in the lever L, that is fulcrumed at L'. The studs on which these levers are fulcrumed screw into lugs of the housings, and the holes in the levers, through which the studs pass, are slightly elongated, so that as a roller is moved vertically the lever may move a trifle endwise, so that the parts are not cramped. A lever, M, is pivoted to the housing directly under the journal at M'. At $m$ this lever is pivoted to the rod $k$, that in turn is pivoted to the free end of the lever K at $k'$. The lever M, at $m'$, is pivoted to the link $l$, that in turn is pivoted at $l'$ to the lever L. The points $m$ and $m'$ are equidistant from the fulcrum M', and as the levers K and L are alike it follows that if the lever M be oscillated on its fulcrum the rollers will be moved equal distances in opening or closing. A poise, M², is suspended from the long arm of the lever M, by means of which the rollers are made to grasp the blank or handle. The shaft J² is intergeared with the shaft j, on which is mounted a band-wheel, j', for driving the feed-rolls.

A device for holding the blank-handle down in the trough H' is as follows: An arm, h, is pivoted at h' to one end of the frame H, directly under the center of the trough H'. (See Fig. 6.) The curved part of this arm is elastic and performs the functions of a spring, and the end thereof terminates in a pivot, on which is journaled the roller h², that, in the position shown in Fig. 6 rests and travels on the blank-handle, causing a slight tension of the curved arm or spring that holds the blank down in the trough. The pivotal point h' being, as aforesaid, directly under the center of the trough, there is no tendency of the roller to draw off sidewise of the blank. The other end of the arm h is pivoted to the rod h³, that in turn is pivoted to the lever h⁴. This lever is fulcrumed at h⁵, and at the other end is pivoted the handle h⁶. By depressing the handle the arm h is turned to the position shown in dotted lines, Fig. 6, in which the roller h² is turned away from the trough. By elevating the handle h⁶ the roller is again returned to the position shown in solid lines, Fig. 6. The edge of the roller h² is beveled, so that the roller will not catch against the corner of the blank as it is pressed up onto the latter. The roller h² may be turned to the position over the trough, and the blank pushed endwise into the trough under the roller. After the blank has been fed along toward the cutters and has passed from under the roller h², this roller, by means of the handle h⁶, is turned back out of the way. Arms H² extend laterally and upward from either end of the frame H, and a rod, H³, extends from arm to arm, and is made parallel with the axial line of the cutter-head. On this rod are mounted the arms N, that may turn or slide on the rod. These arms terminate in a common head, N', with a V-shaped groove, N², that when the head is closed into the trough H' fits onto a corresponding way, N³, that extends along one edge of the trough.

To the head N' is attatched a rod or dead-center, n, of considerable length, that, when the head N' is in its closed position in the trough, is located centrally in the trough and extends toward the cutter-head. The free end of this rod is provided with two or more points, n', for engaging the end of the blank-handle. A handle, N⁴, is connected with the head N', by means of which the head is thrown back in the position, shown in Fig. 6, where it is out of the way of the roller h²; or when this roller is turned out of the way, the head N', by means of this handle, is turned down into the trough H', in which latter position it is shoved forward with sufficient force to cause the points n' to enter the end of the blank-handle. By this means the rear end of the blank is supported as it leaves the feed-rolls i. This rod, by means of the the handle N⁴, is fed along by hand, and passes between the rolls i, supporting the end of the blank until the latter has passed the cutters, after which the completed handle is supported entirely by the rolls i' and i², and the rod n is withdrawn and turned out of the way, ready for another handle. Another blank is placed in the trough. The roller h² is again placed in position on the blank, and the operation is repeated. A train of gears, O, connect the gears of the rolls i with the shaft O', on which the pinion G² is mounted, that engages the rack G'. One end of this shaft O² is journaled in the hand-lever, P that is fulcrumed at P'. By manipulating this lever the train of gears are disconnected when each handle is completed, by means of which the rack and pattern are returned by means of the weight g², as aforesaid, to the place of beginning. A pawl, P, is made to engage a notch on the lever P, to hold the gears to their engagement while the blank-handle is being turned.

What I claim is—

1. In a machine for turning irregular shapes, the combination of a hollow spindle, a cutter-head mounted thereon, blocks in which the cutters are mounted, sliding in suitable ways across the face of the cutter-head, a conical guide-band surrounding the cutter-head and adjustable longitudinally in relation thereto, and rollers attached to the sliding blocks and bearing against the conical guide-band so as to guide the rollers in an orbit made larger or smaller by the longitudinal adjustment of the conical guide-band.

2. In a machine for turning irregular shapes, the combination of a hollow spindle, a cutter-head mounted thereon, blocks to which the cutters are attached sliding in suitable ways across the face of the cutter-head, an elliptical or eccentric guide-band surrounding the cutter-head, and rollers attached to the sliding blocks and bearing against the guide-band so as to move the cutters in and out in the rotation of the cutter.

3. In a machine for turning irregular shapes, the combination of a rotary cutter-head, cutters mounted in blocks sliding in and out on the face of the cutter-head, an elastic guide-band surrounding the cutter-head, set-screws engaging with the guide-band for compressing it into any desired elliptical shape, and rollers attached to the sliding cutter-blocks and bearing on the guide-band so as to guide the rollers in an orbit parallel with said guide-band, as explained.

4. In a machine for turning irregular shapes, the combination of a cutter-head having cutters mounted in blocks sliding toward and from the axes of the cutter-head, an elliptical or eccentric guide-band surrounding the cutter-head, and rollers connected to the sliding blocks and arranged in pairs so as to engage the guide-band both internally and externally and guide the cutters in an orbit corresponding with the shape of the guide-band.

5. The combination, with a cutter-head and cutters and a conical guiding-band arranged to control the cutters in their revolutions, substantially as indicated, of a ring and set-screws for compressing the band into the desired elliptical form, a pattern arranged to move in unison with the blank, suitable connecting mechanism, substantially as shown, for moving the guiding-band to increase or diminish the diameter of the handle according to the shape of the pattern, substantially as set forth.

6. The combination of the guiding-trough H', for the reception and feeding of the blank, the curved elastic lever $h$, the roller $h^2$, for holding the blank down in the trough with a yielding pressure, and a connection, $h^3$, for throwing the lever into operative position, substantially as explained.

7. The combination of the guiding-trough H', the head N', adapted to slide therein, the arms N, carrying the head N', and the guide H', on which the arms N have a swinging and sliding movement, as explained.

8. In a machine for turning irregular forms, the combination of a rotary cutter-head having cutters mounted in sliding blocks and paired feed-rolls journaled at one end in pivoted boxes and at the other in sliding boxes, under control of paired levers connected to an operating-lever common to both and communicating a simultaneous movement to the paired levers and the feed-rollers carried thereby toward or from their common center, as explained.

In testimony whereof I sign this specification, in the presence of two witnesses, this 21st day of August, 1885.

ROBERT G. BURLEIGH.

Witnesses:
G. W. SHUMWAY,
GEORGE TAUSCH.